US008913579B2

(12) United States Patent
Zou et al.

(10) Patent No.: US 8,913,579 B2
(45) Date of Patent: Dec. 16, 2014

(54) RESOLUTION METHOD AND APPARATUS FOR SIMULTANEOUS TRANSMISSION AND RECEIVING CONTENTION IN A DEVICE-TO-DEVICE CELLULAR REUSE SYSTEM

(75) Inventors: Wei Zou, Shanghai (CN); Zhenhong Li, Shanghai (CN); Haifeng Wang, Shanghai (CN); Gang Wu, Shanghai (CN)

(73) Assignee: Nokia Corporation, Espoo (FI)

( * ) Notice: Subject to any disclaimer, the term of this patent is extended or adjusted under 35 U.S.C. 154(b) by 149 days.

(21) Appl. No.: 13/813,779

(22) PCT Filed: Aug. 4, 2010

(86) PCT No.: PCT/CN2010/075698
§ 371 (c)(1),
(2), (4) Date: Feb. 1, 2013

(87) PCT Pub. No.: WO2012/016378
PCT Pub. Date: Feb. 9, 2012

(65) Prior Publication Data
US 2013/0128858 A1 May 23, 2013

(51) Int. Cl.
*H04W 4/00* (2009.01)
*H04W 72/04* (2009.01)
*H04W 76/02* (2009.01)
*H04W 16/10* (2009.01)
*H04W 72/02* (2009.01)

(52) U.S. Cl.
CPC .......... *H04W 72/044* (2013.01); *H04W 76/023* (2013.01); *H04W 72/0453* (2013.01); *H04W 16/10* (2013.01); *H04W 72/02* (2013.01)
USPC ....................................................... 370/329

(58) Field of Classification Search
CPC ..... H04W 72/04; H04W 88/08; H04W 76/00; H04W 80/04; H04W 84/12; H04W 88/06; H04W 24/00
USPC ................. 370/329, 328, 338, 331, 252, 254; 455/450, 452.1
See application file for complete search history.

(56) References Cited

U.S. PATENT DOCUMENTS

| 2009/0325625 | A1 | 12/2009 | Hugl et al. | |
| 2011/0063995 | A1* | 3/2011 | Chen et al. | 370/254 |
| 2014/0023008 | A1* | 1/2014 | Ahn et al. | 370/329 |

FOREIGN PATENT DOCUMENTS

| CN | 101009622 A | 8/2007 |
| CN | 101237670 A | 8/2008 |
| CN | 101541088 A | 9/2009 |

OTHER PUBLICATIONS

Tao Peng et al., "Interference Avoidance Mechanisms in the Hybrid Cellular and Device-to-Device Systems", IEEE 20th International Symposium on Personal, Indoor and Mobile Radio Communications, Sep. 13, 2009, pp. 617-621.
European Search Report application No. 10855516.0 dated Mar. 19, 2014.
International Search Report dated May 19, 2011 corresponding to International Patent Application No. PCT/CN2010/075698.

* cited by examiner

*Primary Examiner* — Chi H Pham
*Assistant Examiner* — Alexander O Boakye
(74) *Attorney, Agent, or Firm* — Squire Patton Boggs (US) LLP

(57) ABSTRACT

According to one embodiment, a method for transmission/reception contention resolution in D2D communication is provided. The method includes detecting, at a device-to-device (D2D) node, re-usable cellular resources based on the scheduling information. The method also includes receiving related information from another D2D node identifying the re-usable cellular resources for the another D2D node, and identifying common and different re-usable cellular resources between the D2D node and the another D2D node. The method also includes receiving updated scheduling information, and determining, from the detected re-usable cellular resources, whether there is a simultaneous transmission/reception contention. When it is determined that there is a simultaneous transmission/reception contention, the method includes resolving the contention by dynamically selecting a direction of communication based on a preconfigured decision criteria, wherein the direction of communication is one of transmission or reception.

21 Claims, 6 Drawing Sheets

RESOLUTION METHOD AND APPARATUS FOR SIMULTANEOUS TRANSMISSION AND RECEIVING CONTENTION IN A DEVICE-TO-DEVICE CELLULAR REUSE SYSTEM

BACKGROUND

1. Field

Embodiments of the invention relate to communications networks and particularly to wireless communications networks. More specifically, embodiments of the invention relate to contention resolution in device-to-device (D2D) communications.

2. Description of the Related Art

Device-to-device (D2D) communication is expected to become a key feature of the future evolution of current $3^{rd}$ Generation (3G) and beyond-3G wireless communication systems, such as long term evolution (LTE) and International Mobile Telecommunications Advanced (IMT-A) systems.

Long Term Evolution (LTE) refers to improvements of the Universal Mobile Telecommunications System (UMTS) through improved efficiency and services, lower costs, and use of new spectrum opportunities. UMTS Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

LTE is a $3^{rd}$ Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD). As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs.

An IMT-A cellular system, sometimes referred to as a 4G system, is expected to have target peak data rates of up to 100 Mbit/s for high mobility, such as mobile access, and up to 1 Gbit/s for low mobility, such as local wireless access. IMT-A systems are expected to utilize frequency-domain equalization schemes, including multi-carrier transmission such as Orthogonal Frequency Division Multiple Access (OFDMA).

One area of endeavor with respect to D2D communication involves ensuring minimal or no signal interference among user terminals, while observing the constraints of network resources. For example, D2D communication can utilize or re-use the same resources within a cellular network, and, therefore, there is a need to coordinate the D2D and cellular communication to optimize the use of resources as to offer guaranteed service levels to the users in the cellular network and minimize the interference between the cellular users and D2D communication.

SUMMARY

One embodiment of the invention is a method for transmission/reception contention resolution in D2D communication. The method includes receiving, at a device-to-device (D2D) node, scheduling information, and detecting re-usable cellular resources based on the scheduling information. The method also includes receiving related information from another D2D node identifying the re-usable cellular resources for the another D2D node, and identifying common and different re-usable cellular resources between the D2D node and the another D2D node. The method also includes receiving updated scheduling information, and determining, from the detected re-usable cellular resources, whether there is a simultaneous transmission/reception contention. When it is determined that there is a simultaneous transmission/reception contention, the method includes resolving the contention by dynamically selecting a direction of communication based on a preconfigured decision criteria, wherein the direction of communication is one of transmission or reception.

Another embodiment of the invention is an apparatus configured to perform transmission/reception contention resolution for D2D communication. The apparatus includes at least one processor, and at least one memory including computer program code. The at least one memory and the computer program code are configured, with the at least one processor, to cause the apparatus at least to receive scheduling information, and detect re-usable cellular resources based on the scheduling information. The at least one memory and the computer program code are further configured, with the at least one processor, to cause the apparatus to receive related information from a D2D node that identifies the re-usable cellular resources for the D2D node, and to identify common and different re-usable cellular resources between the apparatus and the D2D node. The at least one memory and the computer program code are further configured, with the at least one processor, to cause the apparatus to receive updated scheduling information and determine, from the detected re-usable cellular resources, whether there is a simultaneous transmission/reception contention, and, when it is determined that there is a simultaneous transmission/reception contention, to resolve the contention by dynamically selecting a direction of communication based on a preconfigured decision criteria, wherein the direction of communication is one of transmission or reception.

In another embodiment a computer program, embodied on a computer readable storage medium, is provided. The computer program is configured to control a processor to perform a process, which includes receiving, at a device-to-device (D2D) node, scheduling information, and detecting re-usable cellular resources based on the scheduling information. The process also includes receiving related information from another D2D node identifying the re-usable cellular resources for the another D2D node, and identifying common and different re-usable cellular resources between the D2D node and the another D2D node. The process also includes receiving updated scheduling information and determining, from the detected re-usable cellular resources, whether there is a simultaneous transmission/reception contention. When it is determined that there is a simultaneous transmission/reception contention, the process includes resolving the contention by dynamically selecting a direction of communication based on a preconfigured decision criteria, wherein the direction of communication is one of transmission or reception.

BRIEF DESCRIPTION OF THE DRAWINGS

For proper understanding of the invention, reference should be made to the accompanying drawings, wherein.

DETAILED DESCRIPTION

Figure 1:
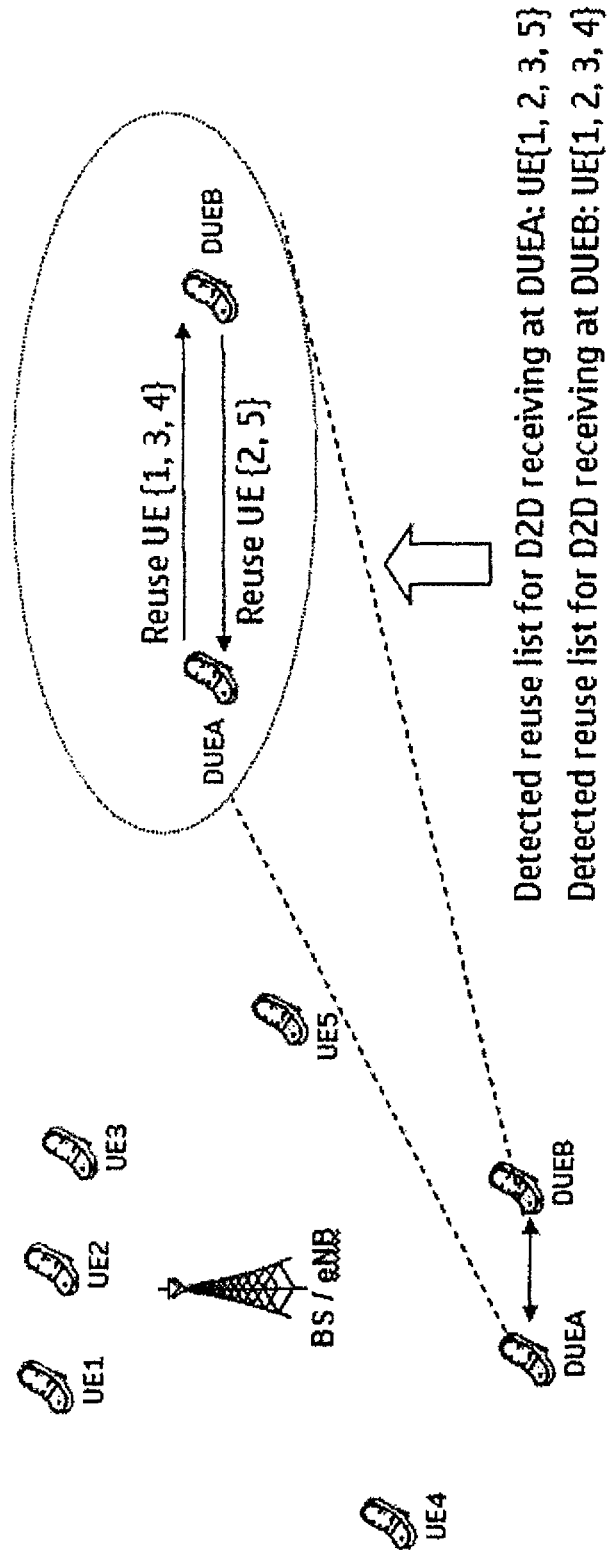
FIG. 1 illustrates a communication system, according to one embodiment of the invention.

Embodiments of the invention provide a distributed transmission (Tx)/reception (Rx) contention resolution method, apparatus and computer program. In one embodiment, the invention can resolve Tx/Rx contention in D2D communication based on scheduling information provided by the enhanced Node B (eNB) and pre-configured detection criteria. Using this scheduling information and criteria, a D2D node can dynamically select one D2D direction (Tx or Rx) to resolve the contention and maximize re-usable resources in the D2D communication.

One example of a D2D communication method is reuse-mode D2D, where D2D nodes communicate with each other using the same uplink (UL) radio resource that is being used by some other cellular user equipments (UEs). In other words, the UL cellular resources occupied by cellular UEs are re-used by D2D nodes in their short-range communications. Thus, in some embodiments, re-use refers to the ability of a D2D node to re-use resources that cellular UEs are allocated to use. According to some embodiments of the invention, it is assumed that only uplink (UL) cellular resource is allowed to be reused by D2D nodes.

For D2D nodes that are close to each other in distance, such a reuse-mode D2D communication method is attractive because a low-power D2D link in short range will not affect the UL operation of concurrent cellular UEs. As the transmission power in short-range D2D communication is very small, the interference from transmitting D2D nodes to an eNB can be neglected. Hence, only cellular-to-D2D interference could become an issue.

When a cellular UE is transmitting traffic to the eNB, the cellular UE's assigned radio resource can be reused by a short-range reuse D2D link if the receiving D2D node (generally it is a cellular UE as well) is far away from that transmitting cellular UE. Due to the large distance between them, interference from the transmitting cellular UE to the receiving D2D node becomes very small. However, if the cellular UE is near to (or not far enough away from) the receiving D2D node, the resource used by the cellular UE will not be allowed to be re-used by the receiving D2D node. To distinguish these two cases, a measurement is performed at the receiving D2D node. For example, a measurement can be made as to the received power for the cellular UE at the D2D node. In one embodiment, if the receive power at the D2D node is smaller than a threshold value, then D2D reuse can be performed.

One solution for deciding which cellular resource can be re-used in a reuse D2D link allows for that decision to be made by each D2D pair themselves. According to this solution, each D2D candidate first receives the UL scheduling information from the eNB and measures the corresponding UL channels. The scheduling information may include, for instance, an indication of which user will perform UL transmission using which part of the uplink resource, the kind of modulation and coding profile, related power control information, etc. Then, the D2D candidate itself finds the cellular UEs whose resource allocation can be reused in its future D2D receiving. After that, related information is exchanged between a D2D pair, and a final list of reused cellular UEs (whose resource allocation can be re-used in their D2D communication) is decided. In one embodiment, the related information includes information identifying the other D2D node's re-usable cellular UEs. The D2D pair then starts monitoring the eNB's scheduling again. Once a cellular UE in the decided list is allocated a radio resource, the D2D pair will reuse a part of the allocated radio resource to perform their short-range D2D communication. In one embodiment, a D2D pair refers to two D2D UEs where one of the D2D UEs is transmitting and the other is receiving.

FIG. 1 illustrates an example of a system which may utilize an autonomous reuse D2D method. As shown in FIG. 1, UE1-UE5 are cellular UEs, and DUE A and DUE B are two D2D UEs of a D2D pair. At DUE A, the detected re-usable cellular UEs for reuse in D2D receiving are UE {1, 2, 3, 5}; while at DUE B, the detected re-usable cellular UEs for reuse in D2D receiving are UE {1, 2, 3, 4}. Based on the scheduling information discussed above, a D2D UE knows which cellular UE is transmitting. To detect re-usable cellular UEs, according to one embodiment, the D2D UE can perform measurement (e.g., power measurement). Based on the measurement result and scheduling information, the D2D UE knows the resource allocated to which cellular UE that it can reuse.

According to one embodiment, DUE A and DUE B exchange their detected re-usable cellular UEs, so that each D2D node is aware of the other node's detected re-usable cellular UEs. After the exchange of related information, DUE A may decide to reuse UE {1, 3, 4} for D2D transmission while DUE B will reuse UE {2, 5} for D2D transmission.

As shown in FIG. 1, each D2D node would have the following information before D2D-link data delivery: (1) a detected reuse list for D2D receiving, such as UE{1,2,3,5} at DUE A and UE{1,2,3,4} at DUE B; (2) a reuse list that is actually used in its D2D receiving, such as UE{1,3,4} at DUE B; and (3) a reuse list that is actually used in its D2D transmission, such as UE{2,5 } at DUE B.

In autonomous reuse D2D, the actual reuse lists used for D2D reception and transmission are decided after exchanging information regarding the detected reuse list for D2D receiving and the negotiation between two D2D UEs. As shown in FIG. 1, a final list of re-used cellular UEs is decided for each D2D direction (Tx or Rx) after negotiation between two D2D nodes. Based on the decision, one D2D UE will transmit data according to that reuse list and the other D2D UE will receive data according to the same reuse list. In one embodiment, this information is stored at both D2D nodes for each D2D direction so that each D2D UE knows when and where to transmit or receive D2D traffic.

Figure 2:
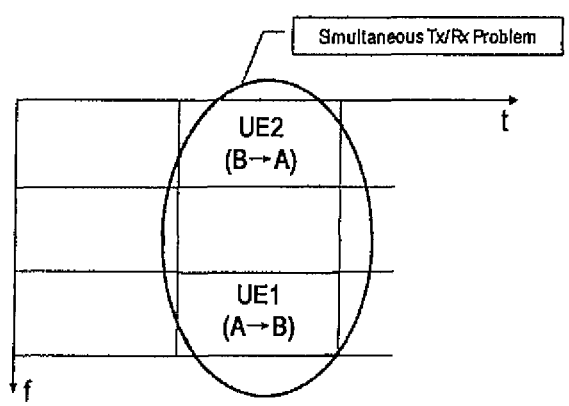
FIG. 2 illustrates an example of a simultaneous Tx/Rx contention, in accordance with one embodiment.

According to the above, as each D2D pair decides which resource to reuse independently, the eNB has no information on the existence of reuse D2D links at all. As a result, the eNB allocates UL radio resources based on information from the cellular UEs. D2D UEs then monitor the eNB's scheduling decisions and reuse a suitable radio resource block (RB) to perform their short-range D2D communication. Under this reuse scenario, as shown in FIG. 2, the two D2D directions of a same D2D pair may separately reuse two simultaneous RBs. Specifically, FIG. 2 illustrates an example where DUE B and DUE A are both attempting to transmit in the same subframe.

As a result, the D2D nodes are attempting to transmit and receive in the same subframe. This can lead to D2D reception failure at each D2D node due to the large interference from its own transmission.

Although OFDMA terminals theoretically use orthogonal subchannels in their communication, small frequency offset caused by hardware imperfection will inevitably generate some inter-subchannel interference. In a general case (e.g., in eNB reception), such noise can be neglected due to a small difference between the receiving powers at each receiving subchannel. However, in the case of simultaneous transmission (Tx) and reception (Rx), the huge power received from the self-transmission subchannel may cause large inter-subchannel interference to the desired receiving channels. This is also the reason why two frequency bands in frequency division duplex (FDD) mode need to be separated by a large spectrum distance. Accordingly, simultaneous Tx/Rx (i.e., transmission and reception in the same subframe) is not allowed in the same UL band, and resource allocation in FIG. 2 will cause reception failure at both D2D UEs in all the contentious RBs. Simultaneous Tx/Rx (i.e., transmitting and receiving in the same subframe) can lead to a very low spectral efficiency in the D2D reuse link. Moreover, many UEs in time division duplex (TDD) systems can only support half-duplex mode. In this case, simultaneous Tx/Rx cannot be supported due to the hardware limitation.

One option for resolving Tx/Rx contentions is to use the eNB to centrally control the list of re-used cellular UEs of each D2D node. According to this option, the eNB can intentionally avoid the occurrence of the D2D Tx/Rx contentions by carefully designing its resource allocations of cellular UEs. However, such a method adds some extra constraints in resource scheduling of cellular UEs.

Therefore, according to an embodiment of the invention, a distributed Tx/Rx contention resolution method based on instantaneous eNB scheduling information is provided for the autonomous reuse-D2D links. By utilizing information available at each D2D node, together with the eNB-broadcasted scheduling information, each D2D node can detect the coming Tx/Rx contentions easily. In some embodiments, the scheduling information can be included in the physical downlink common control channel (PDCCH) in LTE or MAP in WiMAX. MAP refers to transmission map information, which indicates which node will transmit, at which resource position, and by which power level, etc.

Further, a distributed contention resolution method can be applied independently at each D2D node. Thus, in one embodiment, a contention resolution method based on instantaneous scheduling information is provided. This contention resolution method can be implemented by dynamically selecting one D2D direction (Tx or Rx) for the contentious RBs based on the instantaneous scheduling information in order to maximize the reusable resources in the D2D communication.

To coordinate the Tx/Rx actions in a D2D pair so that one D2D node is transmitting and the other D2D node is receiving, both D2D nodes (which might be manufactured by different vendors) would decide the D2D direction (Tx or Rx) of the contentious RBs using the same criterion. The related information can be preconfigured in advance at each D2D UE, or notified by the eNB to all D2D UEs when they enter the network, or negotiated at D2D setup stage.

As described above, each D2D UE would have the following information: (1) a detected reuse list for D2D receiving, such as UE{1,2,3,4} at DUE B; (2) a reuse list that is actually used in its D2D receiving, such as UE{1,3,4} at DUE B; and (3) a reuse list that is actually used in its D2D transmission, such as UE{2,5} at DUE B. By fully utilizing this available information, simultaneous Tx/Rx contentions can be easily detected once a D2D UE obtains the resource scheduling information (for example, contained in PDCCH in a LTE system or MAP in a WiMAX system). For the example illustrated in FIG. 1, when DUE B finds that both UE1 and UE2 are scheduled in the same subframe, a simultaneous Tx/Rx contention is detected because UE1 is in the actual reuse list for receiving at DUE B, and UE2 is in the actual reuse list for transmitting at DUE B. Accordingly, there is a Tx/Rx contention as DUE B should reuse UE1 for D2D receiving and also reuse UE2 for D2D transmitting.

Given the detected reuse lists of both D2D peers, a D2D UE can easily find the common and the different parts between the two reuse lists. For example, in FIG. 1, when DUE B, which has the detected reuse list of UE{1,2,3,4}, receives the detected reuse list UE{1,2,3,5} of DUE A, DUE B knows that UE{1,2,3} is the "common reusable part." In other words, the "common reusable part" refers to the UEs that are common to both the reuse list of DUE A and the reuse list of DUE B. Similarly, DUE B can identify UE{4,5} as the "different reusable part." The "different reusable part" refers to the UEs that are not common to both the reuse list of DUE A and the reuse list of DUE B.

If a contention occurs such that all the RBs are scheduled to cellular UEs that are among the "common reusable part," both D2D directions (either DUEA→DUEB which indicates that DUE A is transmitting and DUE B is receiving, or DUEB→DUEA which indicates that DUE B is transmitting and DUE A is receiving) could be adopted, and the D2D direction of contentious RBs in a subframe is automatically switched to an appropriate direction in a distributed mode based on preconfigured decision criteria, which will be discussed in further detail below. Such appropriate direction would provide that one node is transmitting and the other is receiving. While in the case that the contentious RBs are scheduled to cellular UEs that are among the "different reusable part", again only one direction will be adopted, but the part of contentious RBs with contradictory D2D reuse direction could not be reused any more.

In other words, as mentioned above, a resource block can only be used if interference from a cellular UE is small at the receiving D2D node. In the "common reusable part," both D2D UEs can be receiving by re-using that part of the cellular UEs because interference from cellular UEs are small for both D2D UEs. Hence, D2D communication can be performed in both directions. While for cellular UEs in the "different reusable part," the cellular UE is reused in one D2D direction. The other direction cannot be reused due to the large interference at the receiving D2D node.

Because most of the detected reuse lists for D2D receiving can be common for both D2D peers, most of the contentious RBs can still be reused if both peers of the D2D link are enhanced with the contention resolution method according to this embodiment. Without contention resolution, on the other hand, all the contentious RBs cannot be reused at all at both D2D peers, and the reuse efficiency becomes very low.

Figure 3:
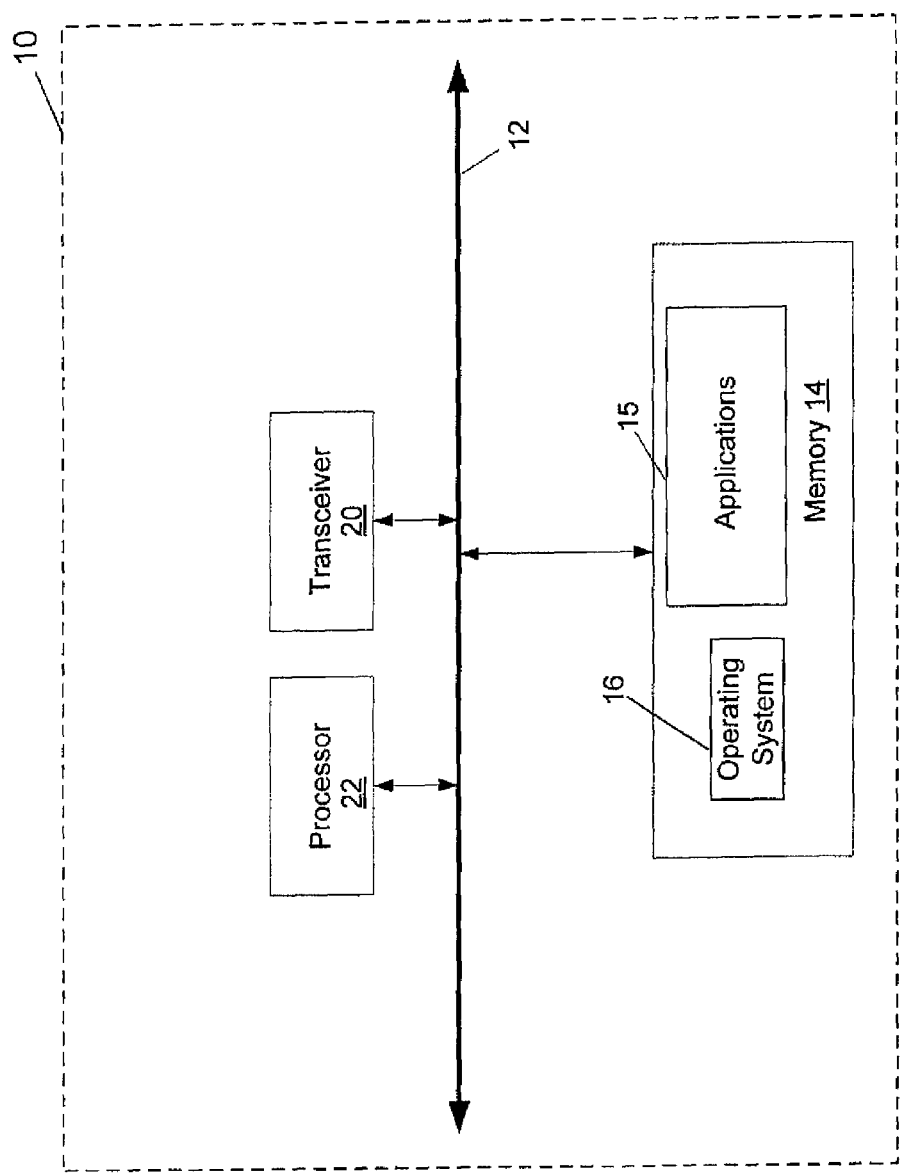
FIG. 3 illustrates a block diagram of an apparatus, according to an embodiment.

FIG. 3 illustrates an example of an apparatus 10 in a communication network, according to one embodiment. According to some embodiments, apparatus 10 may be a UE, such as a D2D UE, or an eNB. Therefore, in some embodiments, apparatus 10 may be implemented in an electronic device, such as a terminal or wireless communications device, including a mobile telephone, portable computer, personal data assistant (PDA), portable game console, or any other electronic device capable of communication.

Apparatus 10 may include an interface 12, such as a bus or other communications mechanism, for communicating information between components of apparatus 10. Alternatively, the components of apparatus 10 may communicate directly with each other, without use of interface 12.

Apparatus 10 also includes a processor 22, coupled to interface 12, for receiving, managing, and/or processing information, and for executing instructions or operations. Processor 22 may be any type of general or specific purpose processor. Apparatus 10 can further include a transceiver 20 for transmitting and/or receiving data or traffic to and from other components of the network.

Apparatus 10 further includes a memory 14 for storing information and instructions to be executed by processor 22. Memory 14 can be comprised of any combination of random access memory (RAM), read only memory (ROM), static storage such as a magnetic or optical disk, or any other type of machine or computer readable media. Computer readable media may be any available media that can be accessed by processor 22 and could include volatile or nonvolatile media, removable or non-removable media, and communication media. Communication media may include computer program code or instructions, data structures, program modules or other data, and includes any information delivery media.

In one embodiment, memory 14 stores software modules or applications that provide functionality when executed by processor 22. The modules may include an operating system 15 that provides operating system functionality for apparatus 10. The memory 14 may also store applications 16, such as text editing or messaging applications, games, web browsers, etc.

As would be understood by those of ordinary skill in the art, apparatus 10 can include additional elements or components not shown in the example of FIG. 3. For instance, apparatus 10 could include additional hardware or software components, such as a user interface, display, keypad, etc.

According to certain embodiments, apparatus 10 may be configured to perform a contention resolution method for D2D communication. For example, in one embodiment, memory 14 including computer program code is configured, with the processor 22, to cause apparatus 10 to receive instantaneous scheduling information from an eNB, and detect re-usable radio resource blocks for D2D communication based on the received scheduling information. Memory 14 and processor 22 may be further configured to cause apparatus 10 to also receive related information from a D2D node that identifies the re-usable radio resource blocks for that D2D node, and to identify common and different re-usable radio resource blocks between the apparatus and the D2D node. Memory 14 and processor 22 are then further configured to cause apparatus 10 to determine, from the detected re-usable radio resource blocks, whether there is a simultaneous transmission/reception contention. When it is determined that there is a simultaneous transmission/reception contention, memory 14 and processor 22 are configured to cause apparatus 10 resolve the contention by dynamically selecting a direction of communication, transmission or reception, based on preconfigured decision criteria.

Therefore, according to one embodiment, whenever a simultaneous Tx/Rx contention is detected, the actual D2D direction could be adopted based on certain pre-configured decision criteria. The pre-configured decision criteria may include:

(i) selecting the same direction as the contentious RB at either the highest- or lowest-frequency;

(ii) selecting the same direction as the contentious RB with majority (e.g., if there are three RBs in contention where two are for B→A, and only one is for A→B, then B→A will be adopted because it has majority);

(iii) using a round-robin mechanism with the initial direction decided by (i) or (ii); or (iv) using a round-robin mechanism based on local information, such as caller and callee roles, etc. In one embodiment, local information refers to some information that is already available at each D2D UE, such as the caller and callee role in a D2D link. Based on such information, a direction can be decided (e.g., from the caller to the callee).

In one embodiment, the applied criterion (or criteria) can be the same at both D2D UEs in order to coordinate the D2D Tx/Rx actions at both D2D peers. The criteria used can be pre-configured and/or signaled in whatever sense.

In some embodiments, once the D2D direction decision is determined, the D2D delivery at each contentious RB can be performed as discussed below depending on whether the contentious RB is scheduled to a cellular UE belonging to the "common reusable part" or the "different reusable part."

Figure 4A:
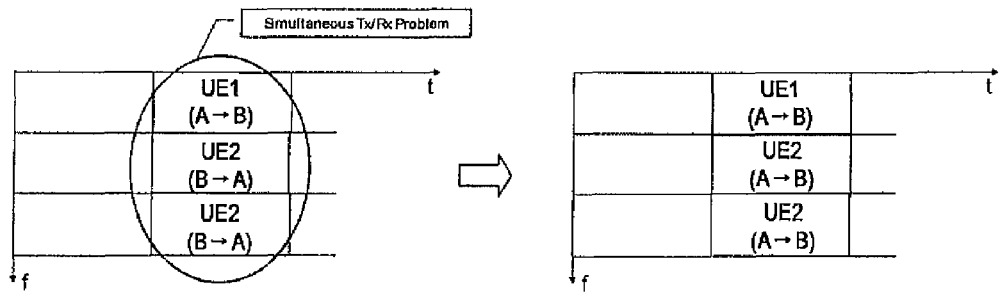
FIG. 4a illustrates a contention resolution example, according to one embodiment.
Figure 4B:
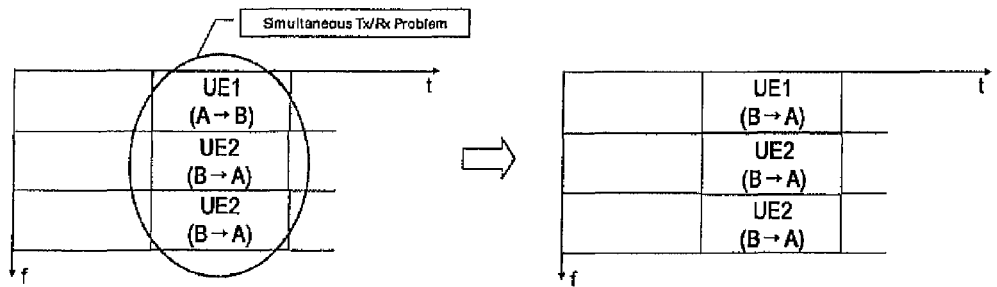
FIG. 4b illustrates a contention resolution example, according to another embodiment.
Figure 4C:
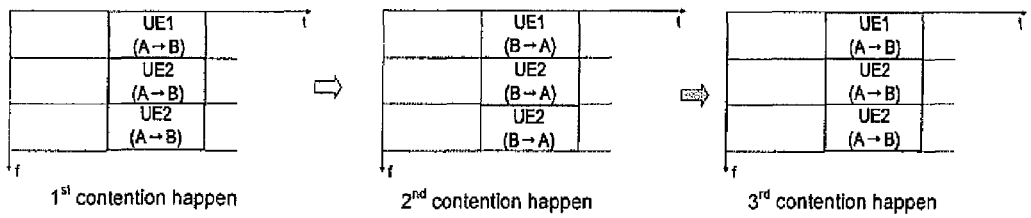
FIG. 4c illustrates a contention resolution example, according to another embodiment.

According to one embodiment, when a contentious RB is scheduled to a cellular UE belonging to the "common reusable part," both D2D peers automatically adjust its D2D direction at that RB to be the same as the preferred D2D direction, and perform the corresponding D2D transmission or receiving. For the example shown in FIG. 1, cellular UE 1, 2, and 3 belong to the "common reusable part". Therefore, the contentious RBs scheduled to them can be fully reused after D2D direction automatic adjustment. FIGS. 4a-4c illustrates three adjustment examples when a different criterion is applied in determining the preferred D2D direction.

The first resolution example, shown in FIG. 4a, is to select the lowest-frequency contentious RB as the reference RB and adjust the D2D direction in all the contentious RBs to be the same as the lowest-frequency contentious RB.

A second method is to choose the direction of the majority of RBs as the preferred D2D direction, as shown in FIG. 4b. As a D2D link only has two directions and each contentious RB can be reused in either one of them, there is a D2D direction in which the majority of contentious RBs are reused. In this case, that majority D2D direction will be decided as the preferred direction and all the contentious RBs are adjusted to be reused in that D2D direction.

Thirdly, the D2D direction of contentious RBs can be aligned based on a round-robin mechanism, as shown in FIG. 4c. That is, one D2D direction can be set in all the contentious RBs in this subframe, and the other direction will be set in the next contentious subframe. For the first time, the D2D direction can be chosen according to the lowest-frequency (or highest-frequency) contentious RB, or majority D2D direction, or some localized information such as caller/callee role of D2D UEs.

According to another embodiment, when a contentious RB is scheduled to a cellular UE belonging to the "different reusable part," this RB is reused in D2D communication when its D2D direction is the same as the preferred D2D direction. Otherwise, that RB will not be reused by the D2D communication to avoid the simultaneous Tx/Rx contention.

Figure 5:
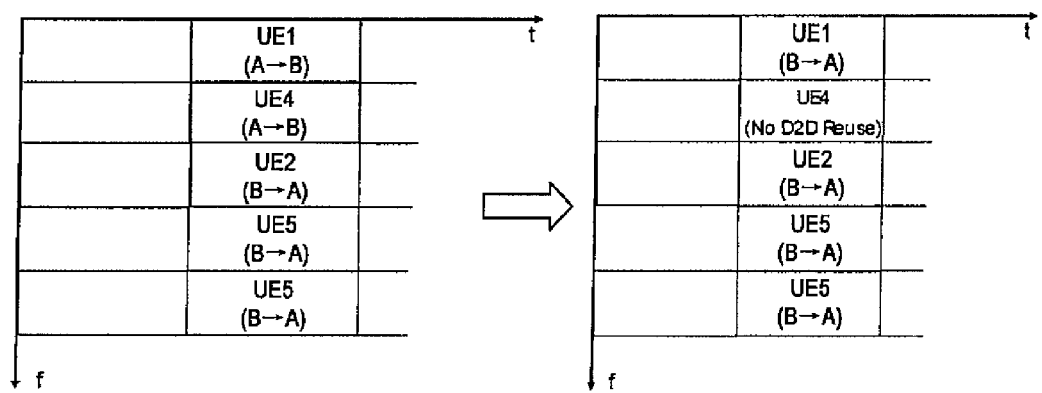
FIG. 5 illustrates an example of contention resolution, according to another embodiment.

FIG. 5 illustrates an example of when some contentious RBs are scheduled to cellular UEs in the "different reusable part." As shown in the example of FIG. 1, cellular UE 4 and 5 belong to the "different reusable part." According to the "majority direction" criterion, D2D direction B→A will be decided as the preferred D2D direction. As UE1 is in the "common reusable part," it can be reused by B→A D2D direction. While UE4 cannot be reused because UE4 is not in the "common reusable part." Consequently, when cellular UE4 is transmitting its uplink traffic to eNB in that subframe, the D2D link cannot reuse that part of the radio resource. Because both D2D peers use the same criterion to decide their actions in contentious RBs, DUE A and DUE B both know how to reuse the contentious RBs, and the D2D communication can be performed successfully.

Figure 6:
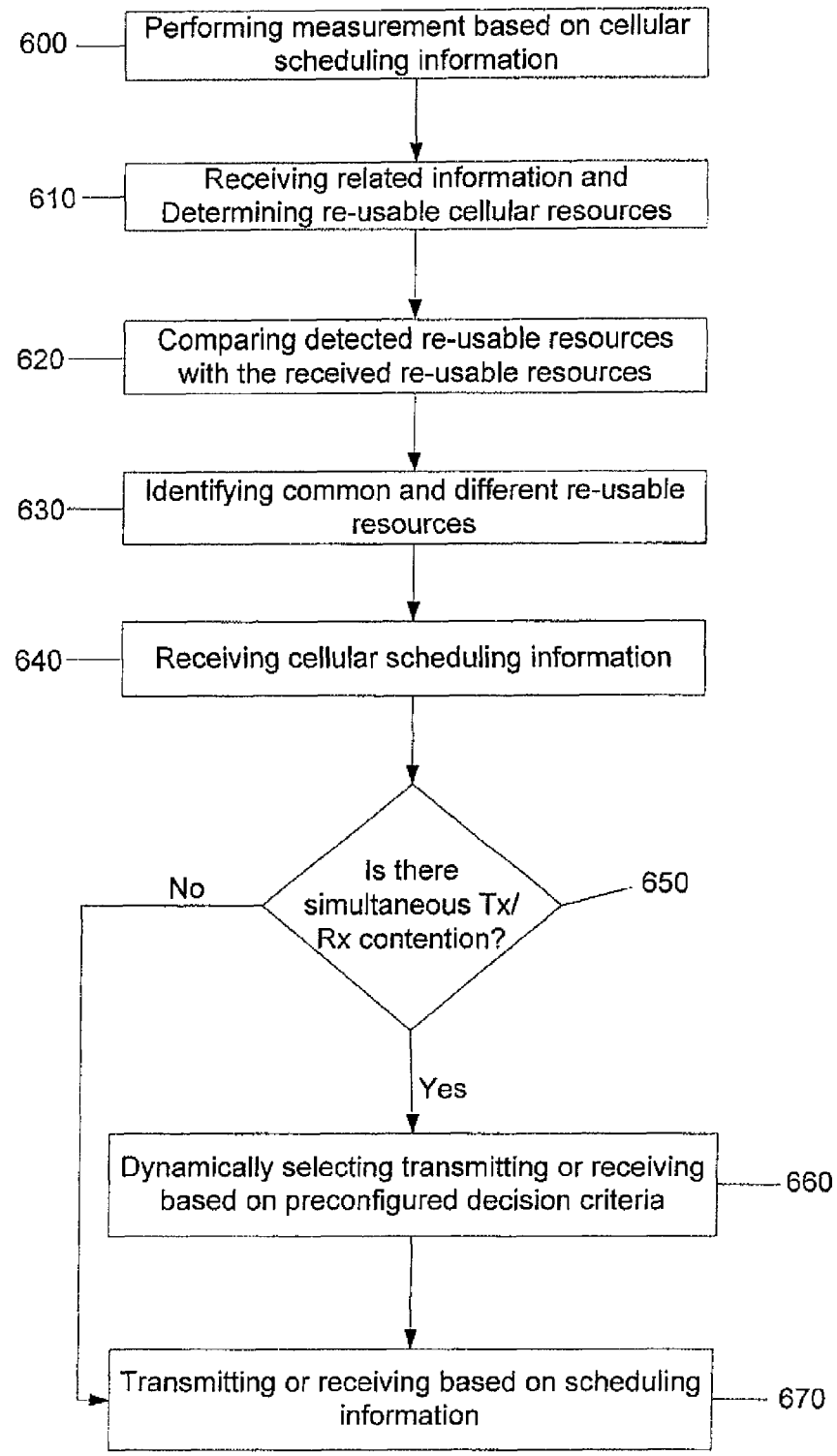
FIG. 6 illustrates a flow chart of a contention resolution method, in accordance with one embodiment.

FIG. 6 illustrates a flow diagram of a contention resolution method for resolving Tx/Rx contention in D2D communication, according to one embodiment of the invention. In one example, the method is performed by a D2D node or UE. As illustrated in the example of FIG. 6, the method includes, at 600, the D2D node performing measurement based on cellular scheduling information and detecting the re-usable cellular UEs in its reuse D2D receiving. In other words, the D2D node can make a measurement based on scheduling information received from the eNB and then decide which cellular UE(s) it can reuse in D2D receiving. The scheduling information is continuously broadcast by an eNB, for example, in the PDCCH of each subframe.

The method may then include receiving, at 610, related information from another D2D node, the related information identifying the re-usable cellular resources for that D2D node. The related information can be used to decide the re-usable cellular UEs for future D2D receiving and transmitting. In this manner, two D2D nodes can exchange information about re-usable cellular UEs and decide upon the cellular UEs to be reused in each D2D direction through negotiation. At 620, the method may include comparing the detected re-usable cellular resources with the re-usable cellular resources received from the other D2D node. Then, at 630, the method includes identifying common and different re-usable cellular resources between the D2D node performing the method and the other D2D node. At 640, the method includes receiving instantaneous cellular scheduling information, for example, from an eNB. Based on the decision regarding cellular UEs to be reused discussed above, the D2D node will find its reuse resource for D2D receiving and transmitting based on the newly received instantaneous scheduling information.

The method further includes, at 650, determining, from the detected re-usable cellular resources, whether there is a simultaneous transmission/reception contention. If a simultaneous transmission/reception contention is detected, then the method includes, at 660, resolving the contention by dynamically selecting transmission or reception as the direction of communication based on the preconfigured decision criteria discussed above. In other words, the D2D node performing the method selects a D2D direction for the contentious resource block(s) based on the common preconfigured decision criteria, and updates the transmission and receiving actions in the contentious resource block(s). Once the simultaneous transmission/reception contention is resolved, or if there is no contention detected, then the method will continue, at 670, with the performing of the transmission or reception. In some embodiments, the D2D node performs the reuse D2D communication (i.e., transmission or reception) according to the decided re-usable cellular UEs in the D2D transmission and reception, the cellular scheduling information, and the update due to Tx/Rx contention, if any.

According to certain embodiments, the method described above can be stored as instructions on a computer readable medium and executed by a processor. The computer-readable medium may be a non-transitory medium that can be encoded with information that, when executed in hardware, performs a process corresponding to the process disclosed in FIG. 6, or any other process discussed herein. Examples of non-transitory mediums include a computer-readable medium, a computer distribution medium, a computer-readable storage medium, and a computer program product.

The computer readable medium mentioned above may be at least partially embodied by a transmission line, a compact disk, digital-video disk, a magnetic tape, a Bernoulli drive, a magnetic disk, holographic disk or tape, flash memory, magnetoresistive memory, integrated circuits, or any other digital processing apparatus memory device.

To coordinate the Tx/Rx actions in a D2D pair (so that one peer is transmitting and the other is receiving), according to one embodiment, both D2D peers decide the D2D direction of the contentious RBs in the same way. The related information can be configured in advance at each D2D UE, or broadcasted by eNB to all D2D UEs when they enter the network. In another embodiment, different D2D pairs can use different decision mechanisms so long as the applied decision criterion is the same in both peers of each pair. When this happens, decision-criterion-related information should be exchanged at the D2D setup stage.

It should be noted that D2D-direction determination according to one or two criteria may not lead to maximal D2D throughput. According to an embodiment, to maximize the D2D throughput, two D2D directions can be analyzed independently and the direction with lager D2D throughput can be decided as the preferred D2D direction. In this case, throughput maximization may be the only criterion applied.

Therefore, embodiments of the invention can resolve Tx/Rx contention, and can reuse the spectrum efficiently. RBs that originally could not be reused due to Tx/Rx contention can now be reused, hence leading to a higher spectrum efficiency compared with the contention case. As most of applicable cellular-D2D reuse is due to geographic distance between transmitting cellular UEs and short-range D2D link, most of the detected reuse list for D2D receiving can be common for both D2D peers. Hence, most of the contentious RBs can still be reused if both peers of the D2D link are enhanced with Tx/Rx contention detection and resolution block according to embodiments of the present invention. Without contention resolution, all the contentious RBs cannot be reused at all at both D2D peers, and the reuse efficiency becomes very low. Moreover, the dynamic selection of the preferred D2D direction based on instantaneous scheduling information maximizes the D2D-reusable resource, hence leading to a maximal D2D throughput.

It should be noted that many of the functional features described in this specification have been presented as modules or applications, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Therefore, one having ordinary skill in the art will readily understand that the invention as discussed above may be practiced with steps in a different order, may be practiced with hardware elements in configurations which are different than those which are disclosed, and that embodiments may be combined in any appropriate manner. Accordingly, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:
   detecting, at a device-to-device (D2D) node, re-usable cellular resources based on scheduling information;
   receiving related information from another D2D node, the related information identifying the re-usable cellular resources for the another D2D node;
   identifying common and different re-usable cellular resources between the D2D node and the another D2D node;
   receiving updated scheduling information;
   determining, from the detected re-usable cellular resources, whether there is a simultaneous transmission/reception contention; and
   when it is determined that there is a simultaneous transmission/reception contention, resolving the contention by dynamically selecting a direction of communication based on a preconfigured decision criteria, wherein the direction of communication is one of transmission or reception.

2. The method according to claim 1, wherein the receiving comprises receiving instantaneous scheduling information from an enhanced node B.

3. The method according to claim 1, wherein the detecting comprises detecting at least one re-usable radio resource block to perform D2D communication.

4. The method according to claim 1, wherein the detecting comprises identifying a list of cellular resources that are used for D2D receiving and transmitting, respectively.

5. The method according to claim 1, wherein the identifying comprises comparing the re-usable cellular resources at the D2D node with the re-usable cellular resources at the another D2D node.

6. The method according to claim 1, wherein it is determined that that there is a simultaneous transmission/reception contention when the D2D node can both transmit and receive in a single radio resource block.

7. The method according to claim 1, wherein the preconfigured decision criteria comprises selecting the direction of communication to be a same direction as a contentious radio resource block with one of the highest or lowest frequency.

8. The method according to claim 1, wherein the preconfigured decision criteria comprises selecting the direction of communication to be a same direction as a majority of contentious radio resource blocks.

9. The method according to claim 1, wherein the preconfigured decision criteria comprises selecting the direction of communication using a round-robin mechanism with an initial direction of communication set to be a same direction as a contentious radio resource block with one of the highest or lowest frequency, or set to be a same direction as a majority of contentious radio resource blocks.

10. The method according to claim 1, wherein the preconfigured decision criteria comprises selecting the direction of communication using a round-robin mechanism based on local information.

11. An apparatus, comprising:
    at least one processor; and
    at least one memory including computer program code;
    the at least one memory and the computer program code are configured, with the at least one processor, to cause the apparatus at least to
    detect re-usable cellular resources based on scheduling information;
    receive related information from a D2D node, the related information identifying the re-usable cellular resources for the D2D node;
    identify common and different re-usable cellular resources between the apparatus and the D2D node;
    receive updated scheduling information;
    determine, from the detected re-usable cellular resources, whether there is a simultaneous transmission/reception contention; and
    when it is determined that there is a simultaneous transmission/reception contention, resolve the contention by dynamically selecting a direction of communication based on a preconfigured decision criteria, wherein the direction of communication is one of transmission or reception.

12. The apparatus according to claim 11, wherein the apparatus comprises a D2D node.

13. The apparatus according to claim 11, wherein the at least one memory and the computer program code are configured, with the at least one processor, to cause the apparatus to receive instantaneous scheduling information from an enhanced node B.

14. The apparatus according to claim 11, wherein the at least one memory and the computer program code are configured, with the at least one processor, to cause the apparatus to detect at least one re-usable radio resource block to perform D2D communication.

15. The apparatus according to claim 11, wherein the at least one memory and the computer program code are configured, with the at least one processor, to cause the apparatus to identify a list of cellular resources that will actually be used by the apparatus for D2D receiving and transmitting, respectively.

16. The apparatus according to claim 11, wherein the at least one memory and the computer program code are configured, with the at least one processor, to cause the apparatus to determine that that there is a simultaneous transmission/reception contention when the D2D node can both transmit and receive in a single radio resource block.

17. The apparatus according to claim 11, wherein the preconfigured decision criteria comprises selecting the direction of communication to be a same direction as a contentious radio resource block with one of the highest or lowest frequency.

18. The apparatus according to claim 11, wherein the preconfigured decision criteria comprises selecting the direction of communication to be a same direction as a majority of contentious radio resource blocks.

19. The apparatus according to claim 11, wherein the preconfigured decision criteria comprises selecting the direction of communication using a round-robin mechanism with an initial direction of communication set to be a same direction as a contentious radio resource block with one of the highest or lowest frequency, or set to be a same direction as a majority of contentious radio resource blocks.

20. The apparatus according to claim 11, wherein the preconfigured decision criteria comprises selecting the direction of communication using a round-robin mechanism based on local information.

21. A computer program, embodied on a non-transitory computer readable medium, the computer program configured to control a processor to perform operations, comprising:
  detecting, at a device-to-device (D2D) node, re-usable cellular resources based on the scheduling information;
  receiving related information from another D2D node, the related information identifying the re-usable cellular resources for the another D2D node;
  identifying common and different re-usable cellular resources between the D2D node and the another D2D node;
  receiving updated scheduling information;
  determining, from the detected re-usable cellular resources, whether there is a simultaneous transmission/reception contention; and
  when it is determined that there is a simultaneous transmission/reception contention, resolving the contention by dynamically selecting a direction of communication based on a preconfigured decision criteria, wherein the direction of communication is one of transmission or reception.

* * * * *